(12) United States Patent  
Huang

(10) Patent No.: US 8,215,942 B2  
(45) Date of Patent: Jul. 10, 2012

(54) MOLD WITH EJECTION MECHANISM

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 63 days.

(21) Appl. No.: 12/838,482

(22) Filed: Jul. 18, 2010

(65) Prior Publication Data  
US 2011/0076354 A1 Mar. 31, 2011

(30) Foreign Application Priority Data  
Sep. 25, 2009 (CN) .......................... 2009 1 0307700

(51) Int. Cl.  
B29C 45/40 (2006.01)

(52) U.S. Cl. .................... 425/192 R; 425/190; 425/444; 425/468

(58) Field of Classification Search .................. 425/190, 425/444, 468, 556, DIG. 58  
See application file for complete search history.

(56) References Cited

U.S. PATENT DOCUMENTS

| 3,844,703 | A | * | 10/1974 | Hutter ............................ 425/556 |
| 3,871,611 | A | * | 3/1975 | Taketa ........................... 249/102 |
| 3,900,183 | A | * | 8/1975 | Wallace ........................... 249/68 |
| 3,963,209 | A | * | 6/1976 | Muller ............................ 249/67 |
| 4,280,549 | A | * | 7/1981 | Gibbs ............................. 164/113 |
| 4,379,684 | A | * | 4/1983 | Katagiri et al. .................. 425/78 |
| 4,545,753 | A | * | 10/1985 | Hehl .............................. 425/350 |
| 4,645,446 | A | * | 2/1987 | Hehl .............................. 425/350 |
| 4,793,785 | A | * | 12/1988 | Osada ............................ 425/116 |
| 4,929,170 | A | * | 5/1990 | Boskovic ....................... 425/556 |
| 5,059,105 | A | * | 10/1991 | Baird ............................ 425/116 |
| 5,316,467 | A | * | 5/1994 | Starkey ......................... 425/438 |
| 5,511,967 | A | * | 4/1996 | Berdan .......................... 425/533 |
| 5,718,930 | A | * | 2/1998 | Stengel ......................... 425/556 |
| 6,872,069 | B2 | * | 3/2005 | Starkey ......................... 425/556 |
| 7,140,868 | B1 | * | 11/2006 | Steele et al. ................... 425/438 |
| 7,214,046 | B2 | * | 5/2007 | Gakovic ......................... 425/78 |
| 7,267,538 | B2 | * | 9/2007 | Morales-Centeno ......... 425/190 |
| 2004/0182806 | A1 | * | 9/2004 | Figueroa .................... 211/105.4 |
| 2004/0241278 | A1 | * | 12/2004 | Morales-Centeno ......... 425/556 |

* cited by examiner

Primary Examiner — Yogendra Gupta  
Assistant Examiner — Emmanuel S Luk  
(74) Attorney, Agent, or Firm — Altis Law Group, Inc.

(57) ABSTRACT

A mold comprises a core plate receiving a core insert, a cavity plate receiving a cavity insert and an ejection mechanism configured to eject the core insert. The core insert defines a first molding surface and the cavity insert defines a second molding surface cooperating with the first molding surface. The ejection mechanism includes a top plate; a sleeve fastening to the core plate and an ejection member to eject the core. The ejection member including an ejection rod and an ejection head slidably received in the sleeve. The ejection rod includes a main rod fastened to the top plate, a connecting body, and an engaging body. The ejection head includes an ejection portion and an engaging portion defining an engaging hole, a slot, and an opening, wherein the connecting body extends through the slot causing the engaging body to engage with the engaging hole.

8 Claims, 6 Drawing Sheets

MOLD WITH EJECTION MECHANISM

BACKGROUND

1. Technical Field

The present disclosure relates to a mold that can prevent an axis of a core insert from deviating when being ejected.

2. Description of Related Art

Referring to FIG. 1, a conventional mold 40 includes a core insert 41, a cavity plate 42 and an ejection mechanism 30 to eject the core insert 41. The ejection mechanism 30 includes a top plate 31, a bottom plate 32, an ejection member 33, a washer 34, and a fastener 35. The top plate 31 defines a first fastening hole 310 facing the bottom plate 32. The bottom plate 32 defines a first through hole 320. One end of the ejection member 33 is received in the first through hole 320 and defines a second fastening hole 330 aligning with the first fastening hole 310, and an opposite end always stays in contact with the core insert 41. The washer 34 is disposed between the top plate 31 and the bottom plate 32 and defines a second through hole 340 communicating with the first fastening hole 310 and the first through hole 320. The fastener 35 is screwed into the first fastening hole 310 and the second fastening hole 330 through the second through hole 340 to fasten the top plate 31 and the bottom plate 32.

The core insert 41 defines a first molding surface 410 and the cavity plate 42 defines a second molding surface 420. While in use, the top plate 31 drives the ejection member 33 to eject the core insert 40. After long time use, the ejection member 33 deflects, causing the first molding surface 410 to deflect relative to the second molding surface 420. Thus, a gap is created between the first molding surface 410 and second molding surface 420. Molten plastic will flow to fill the gap, which affects the quality of the molded work pieces.

Therefore, what is needed is a mold to overcome the shortcoming described above.

DETAILED DESCRIPTION

Figure 1:
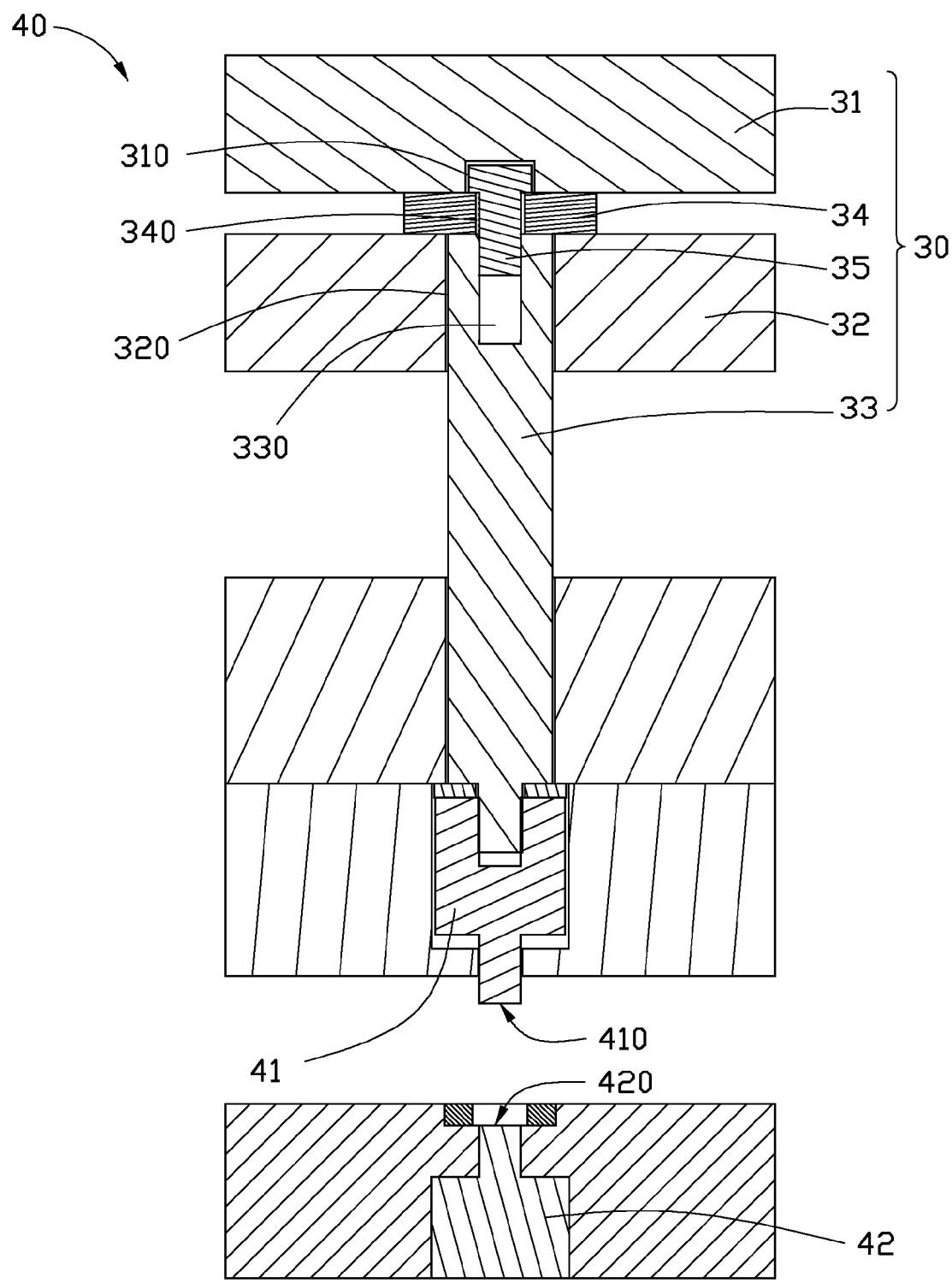
FIG. 1 is a cross-sectional view of a conventional mold.
Figure 2:
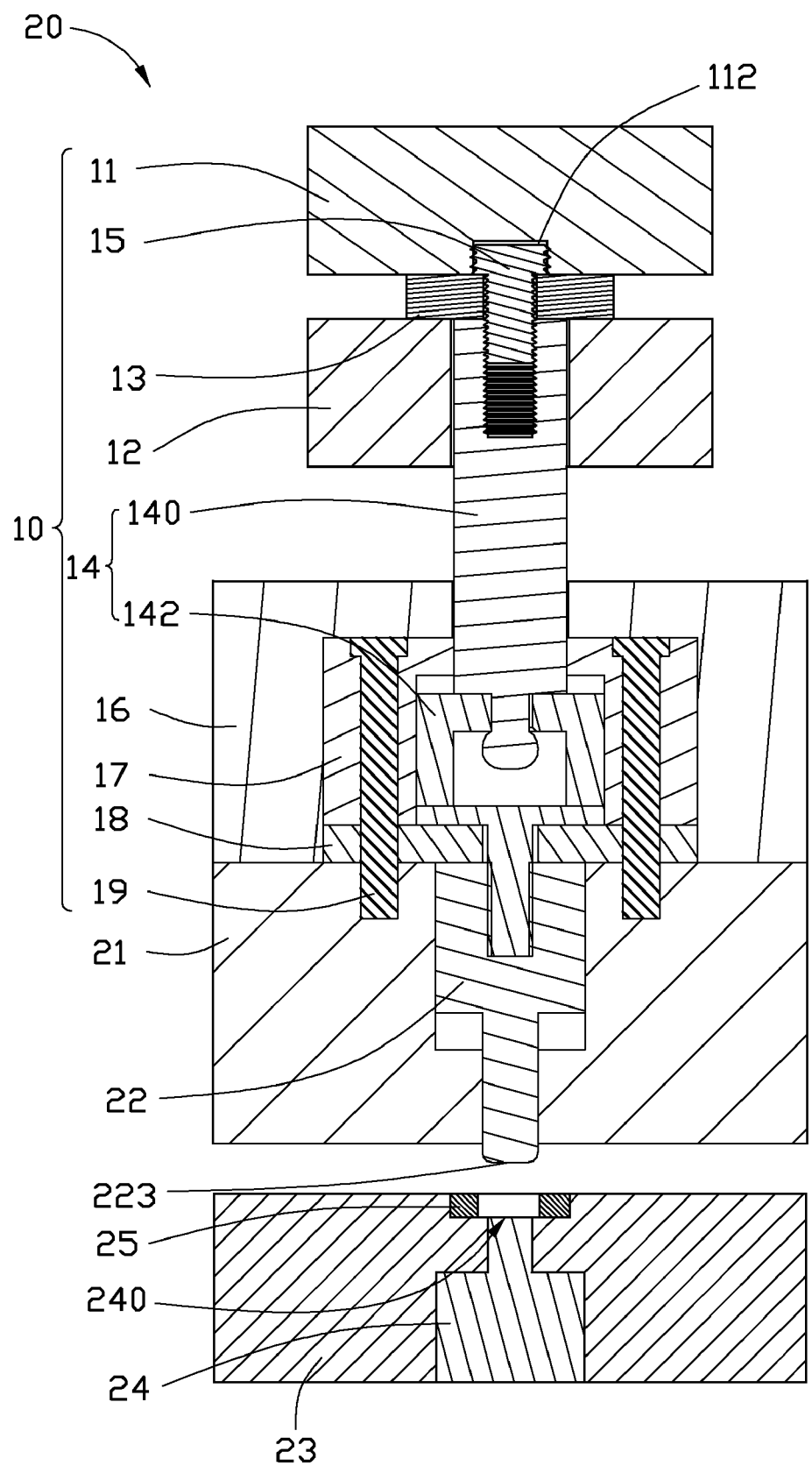
FIG. 2 is a cross-sectional view of a mold in accordance with an exemplary embodiment.

Referring to FIG. 2, a mold 20 according to an exemplary embodiment is disclosed. The mold 20 includes an ejection mechanism 10, a core plate 21 receiving a core insert 22, and a cavity plate 23 receiving a cavity insert 24 and a cushion 25. The core insert 22 defines a first molding surface 223 and the cavity insert 24 defines a second molding surface 240 opposite to the first molding surface 223. The first molding surface 223 and the second molding surface 240 corporately constitute a molding cavity. The ejection mechanism 10 is configured to eject the core insert 22, thus the solidified moldings between the first molding surface 223 and the second molding surface 240 are obtained.

The ejection mechanism 10 includes a top plate 11, a bottom plate 12, a first washer 13, an ejection member 14, a fastener 15, a support plate 16, a sleeve 17, a second washer 18 and two locating members 19. The ejection member 14 includes an ejection rod 140 fastened to the top plate 11 and an ejection head 142 contacting the core insert 22. The top plate 11 drives the ejection rod 140 to move to the cavity plate 23, causing the ejection head 142 to eject the core insert 22.

Figure 3:
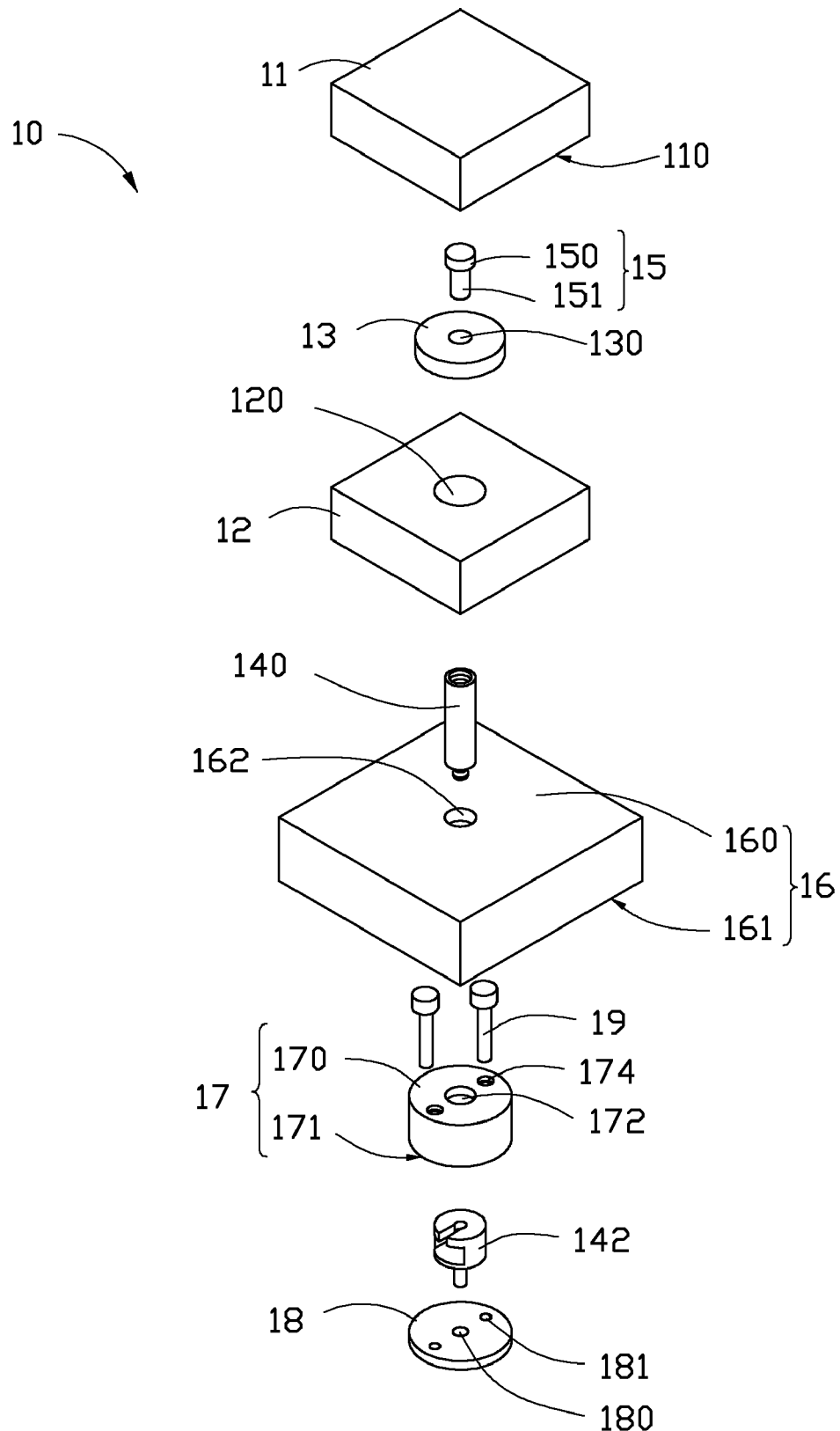
FIG. 3 is an exploded, isometric view of the mold of FIG. 2, showing an ejection mechanism of the mold.
Figure 4:
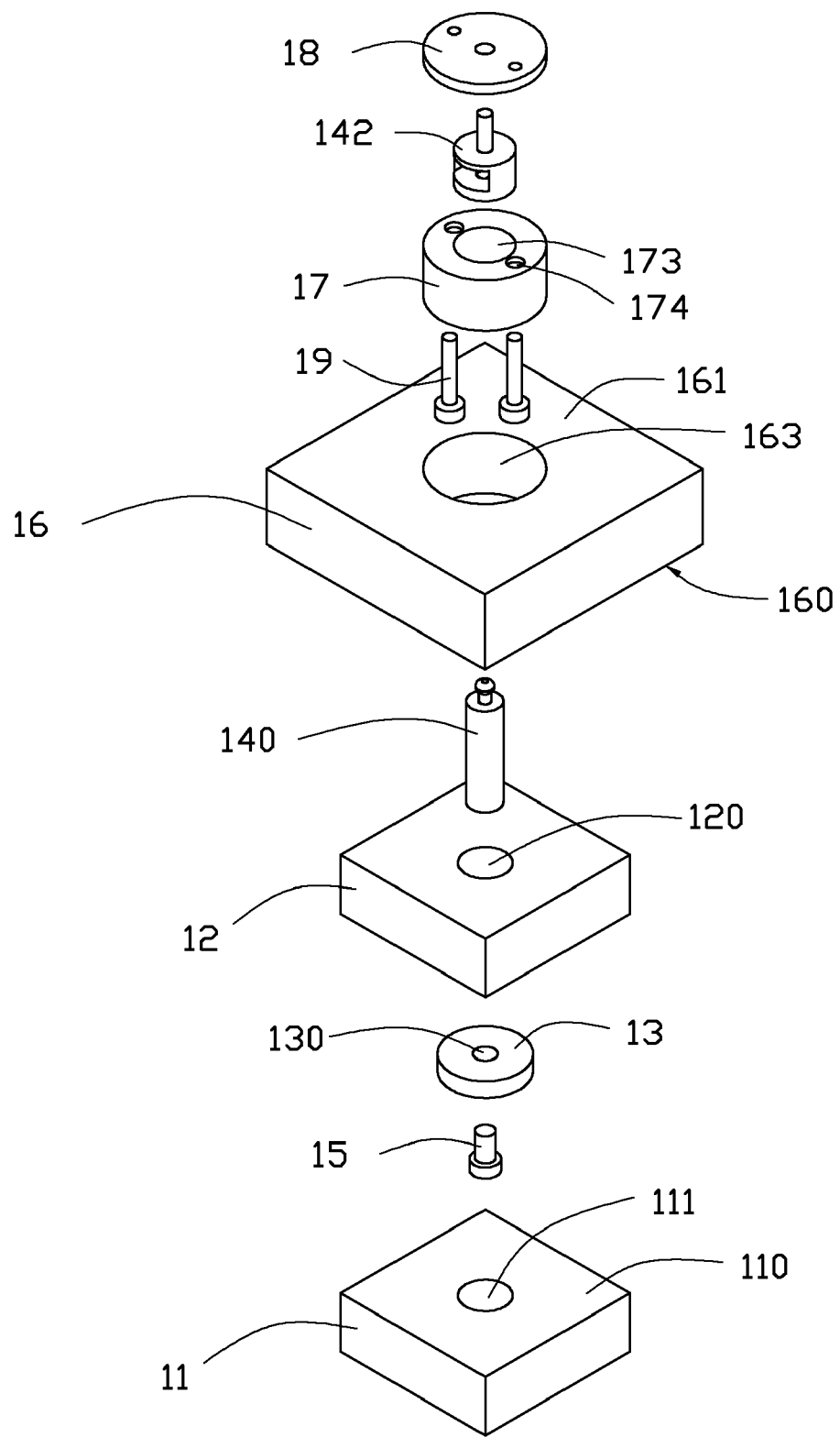
FIG. 4 is similar to FIG. 3, but viewed from a reverse perspective.

Referring to FIGS. 3 and 4, the top plate 11 is substantially rectangular and defines a first fastening hole 111 in a surface 110 facing the bottom plate 12 (see FIG. 2). In the exemplary embodiment, the first fastening hole 111 is a threaded blind hole.

The bottom plate 12 is shaped like the top plate 11 and defines a guide hole 120 aligned with the first fastening hole 111. The diameter of the guide hole 120 is greater than that of the first fastening hole 111.

The first washer 13 is disposed between the top plate 11 and the bottom plate 12. The first washer 13 defines a washer hole 130 aligned with the first fastening hole 111 and the guide hole 120. The diameter of the washer hole 130 is less than that of the first fastening hole 111.

Figure 5:
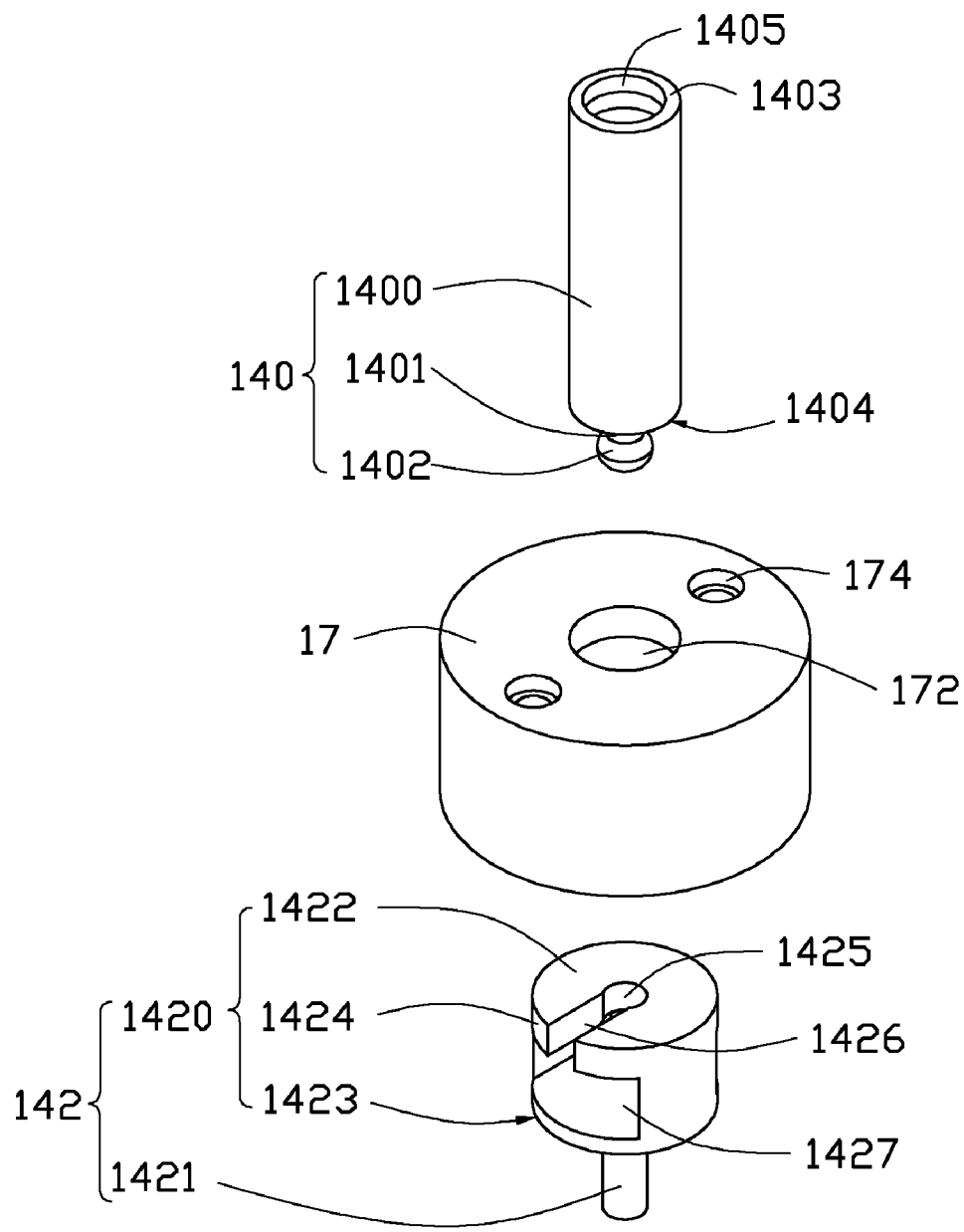
FIG. 5 is an exploded, isometric view of an ejection member and a sleeve of the ejection mechanism FIG. 3.

Referring to FIG. 5, the ejection member 14 includes an ejection rod 140 and an ejection head 142 engaging with each other. The ejection rod 140 includes a main rod 1400, a connecting body 1401 and an engaging body 1402 connecting with each other. The main rod 1400 is cylinder-shaped and includes a first surface 1403 and a second surface 1404 opposite to each other. The diameter of the main rod 1400 is slightly less than that of the guide hole 120. The first surface 1403 defines a second fastening hole 1405 aligned with the washer hole 130. The connecting body 1401 connects the engaging body 1402 to the main rod 1400. The diameter of the connecting body 1401 is less than that of the main rod 1400 and the engaging body 1402. In this embodiment, the engaging body 1402 is spherical.

The ejection head 142 includes an engaging portion 1420 and an ejection portion 1421 connecting with each other. The engaging portion 1420 includes a top 1422, a bottom 1423 and a side 1424 connecting with each other. The engaging portion 1420 defines an engaging hole 1425 in the top 1422, an opening 1427 in the side 1424 and a slot 1426. The slot 1426 extends through the top 1422 and the side 1424 that communicates with the engaging hole 1425 and the opening 1427. The width of the slot 1426 is greater than the diameter of connecting portion 1401. Such that the connecting portion 1401 can extend through the slot 1426 and the engaging body 1402 is received in the opening 1427 to engage with the engaging hole 1425.

The fastener 15 is a bolt that includes a first threaded head 150 and a second threaded head 151 connecting with each other. The first threaded head 150 is screwed into the first fastening hole 111, and the second threaded head 151 is screwed into the washer hole 130 and the second fastening hole 1403. Hence, the fastener 15 fastens the top plate 11, the first washer 13, and the ejection rod 140 together.

The support plate 16 is disposed on the core plate 21 and includes a third surface 160 facing the core plate 21 and an opposite fourth surface 161. The third surface 160 defines a first through hole 162 and the fourth surface 161 defines a first receiving hole 163 aligned and communicating with the first though hole 162. The diameter of the first through hole 162 is slightly greater than that of the ejection rod 140 and less than that of the first receiving hole 163.

The sleeve 17 is retained within the first receiving hole 163 of the support plate 16. The sleeve 17 includes a fifth surface 170 close to a top of the receiving hole 163 and a sixth surface 171 opposite to the fifth surface 170. The fifth surface 170 defines a second through hole 172 extending along the center line of the sleeve 17 and the sixth surface 171 defines a second receiving hole 173 aligned and communicating with the second through hole 172. The diameter of the second through hole 172 is slightly greater than that of the ejection rod 140 and less than that of the second receiving hole 173. The sleeve 17 further defines two first locating holes 174 through the fifth surface 170 and the sixth surface 171. In the exemplary embodiment, the first locating holes 174 are threaded stepped holes.

The second washer 18 is also retained with the first receiving hole 163 of the support plate 16 to support the sleeve 17. The second washer 18 defines a third through hole 180 in the center and two second locating holes 181 respectively aligned with one of the first locating holes 174.

Figure 6:
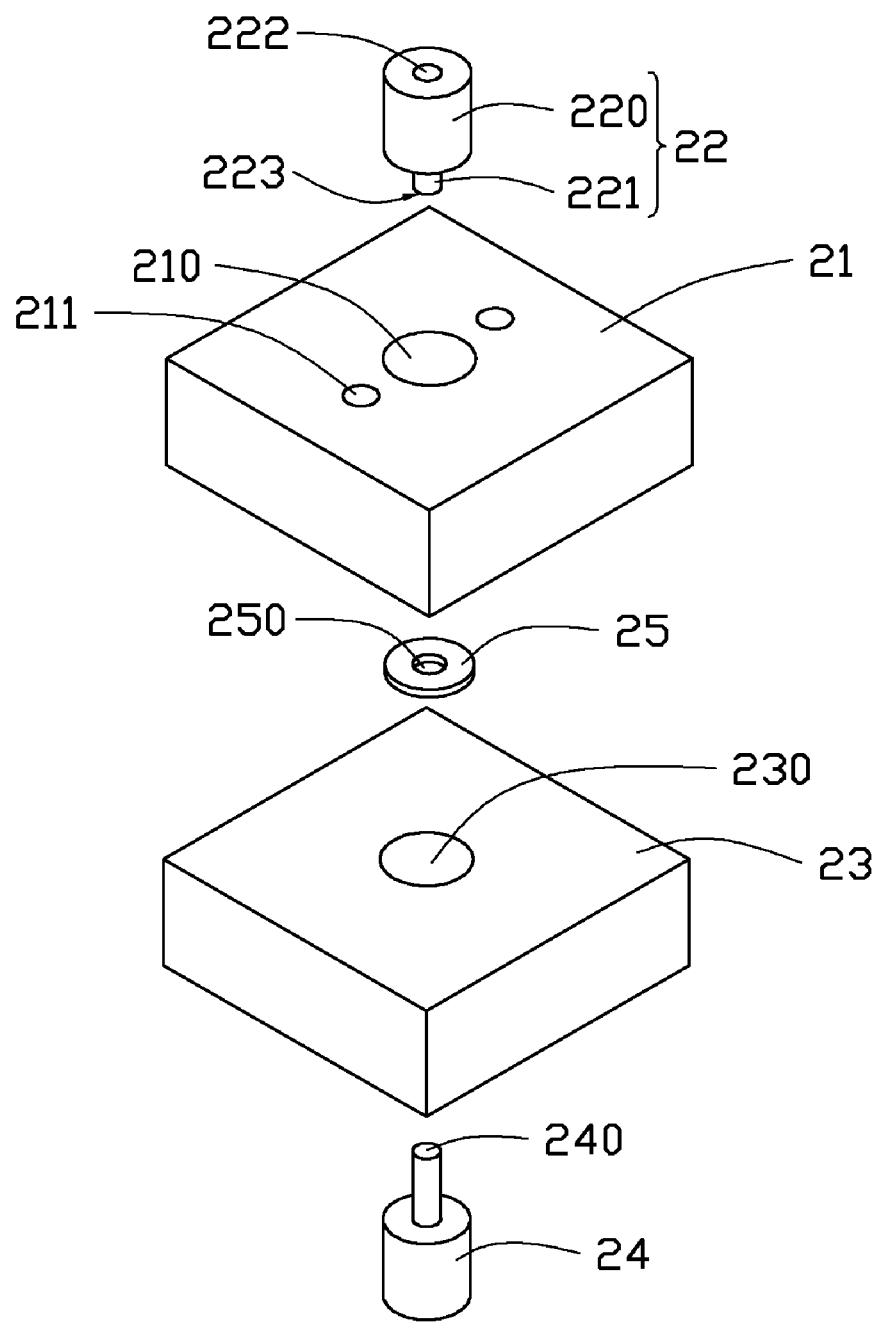
FIG. 6 is an exploded, isometric view of part of the mold of FIG. 2.

Referring to FIG. 6, the core plate 21 is disposed to contact the fourth surface 161 of the support plate 16. The core plate 21 defines a first cavity 210 and two third locating holes 211 aligned with the first locating holes 174 and the second locating holes 181.

The two locating members 19 are screwed into the first locating holes 174, the second locating holes 181, and the third locating holes 211. The sleeve 17 is thus connected to the core plate 21.

Referring to FIG. 6, the core insert 22 is shaped to match the first cavity 210 of the cavity plate 21 and includes an ejection portion 230 and a molding portion 231 connecting with each other. The diameter of the ejection portion 230 is greater than that of the molding portion 231. The ejection portion 230 defines an ejection hole 232 aligned with the third through hole 180 of the second washer 18. The molding portion 231 defines a first molding surface 223 that is external to the core plate 21.

The cavity plate 23 defines a second cavity 230 for receiving the cavity insert 24 and the cushion 25. The cavity insert 24 defines a second molding surface 240 and the cushion defines 25 a fourth through hole 250. The ejection portion 221 of the core insert 22 extends through the fourth through hole 250, causing the first molding surface 223 to contact the second molding surface 240.

While in use, the core plate 21 and the cavity plate 23 are detached from each other. The top plate 11 drives the ejection rod 140 to move to the core plate 21. The second surface 1404 of the main rod 1400 then contacts the top 1422 of the ejection head 142 and the ejection portion 1421 to eject the core insert 22.

The top plate 11 drives the ejection rod 140 to move away from the core plate 21. The first molding surface 223 thus detaches from the second molding surface 240, thus the molding is obtained. While the ejection rod 140 moves away from the core plate 21, the engaging body 1402 engages into the engaging hole 1425. Though the ejection rod 140 goes off axis in the guide hole 120, the ejection head 142 will not go off axis causing the core insert 22 to deflect relative to the cavity insert 24.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A mold with ejection mechanism comprising:
 a core insert;
 a core plate configured for receiving the core insert;
 a cavity insert;
 a cavity plate configured for receiving the cavity insert, the cavity insert and the core insert cooperatively defining a molding cavity;
 an ejection mechanism configured to eject the core insert, comprising:
  a top plate;
  a sleeve fastened to the core plate and defining a second through hole and a second receiving hole aligned and communicating with each other, wherein the diameter of the second receiving hole is greater than that of the second through hole; and
  an ejection member comprising an ejection rod and an ejection head slidably received in the second receiving hole, the ejection rod comprising a main rod fastened to the top plate, a connecting body, and a spherical engaging body, wherein the diameter of the connecting body is less than that of the engaging body and the main rod, the ejection head comprises an ejection portion and an engaging portion, the engaging portion defines an engaging hole in a top, an opening in a side, and an slot communicating the engaging hole and the opening, the connecting body extends through the slot causing that the engaging body is received in the opening to engage with the engaging hole.

2. The mold as described in claim 1, further comprising a first washer and a fastener for fastening the ejection rod, the first washer and the top plate together.

3. The mold as described in claim 2, wherein the top plate defines a first fastening hole, the first washer defines a washer hole, and the ejection rod defining a second fastening hole, the fastener comprises a first threaded head screwed into the first fastening hole and a second threaded head screwed into the second fastening hole and the washer hole.

4. The mold as described in claim 1, further comprising a bottom plate defining a guide hole, wherein the ejection rod extends through the guide hole.

5. The mold as described in claim 1, wherein the core insert comprises a molding portion and an ejection portion defining an ejection hole for receiving the ejection portion of the ejection member.

6. The mold as described in claim 1, wherein the ejection mechanism comprises a second washer and two locating members to connect the sleeve to the core plate.

7. The mold as described in claim 6, wherein the sleeve defines two first locating holes, the washer defines two second locating holes, the core plate defines a third locating hole, the two locating members are screwed into the first locating holes, the second locating holes and the third locating holes, respectively.

8. The mold as described in claim 7, wherein the ejection mechanism further comprises a support plate defining a first through hole for the ejection rod extending through and a first receiving hole, the sleeve and the second washer are received in the first receiving hole.

* * * * *